(12) United States Patent
Levine

(10) Patent No.: US 6,973,733 B2
(45) Date of Patent: Dec. 13, 2005

(54) STRAIGHTEDGE WITH HANDLE AND LEVEL

(75) Inventor: Steven R. Levine, Mooresville, NC (US)

(73) Assignee: Irwin Industrial Tool Company, Huntersville, NC (US)

( * ) Notice: Subject to any disclaimer, the term of this patent is extended or adjusted under 35 U.S.C. 154(b) by 0 days.

(21) Appl. No.: 10/769,735

(22) Filed: Jan. 30, 2004

(65) Prior Publication Data

US 2004/0226181 A1 Nov. 18, 2004

Related U.S. Application Data

(60) Provisional application No. 60/464,184, filed on Apr. 21, 2003.

(51) Int. Cl.$^7$ .............................. G01B 3/04; B43L 7/00
(52) U.S. Cl. .......................................... 33/484; 33/451
(58) Field of Search ........................... 33/451, 484, 485, 33/489, 491, 483, 486, 487, 488, 490, 492, 33/493, 494

(56) References Cited

U.S. PATENT DOCUMENTS

| | | | |
|---|---|---|---|
| 566,195 A * | 8/1896 | Leavitt ........................ 33/485 |
| 722,141 A * | 3/1903 | Probst ......................... 33/485 |
| 812,740 A | 2/1906 | Harris et al. |
| 1,118,907 A | 11/1914 | Nordlie |
| 1,665,504 A | 4/1928 | Midgley |
| 1,754,035 A | 4/1930 | Morren |
| 1,982,178 A | 11/1934 | Rudolph |
| 2,307,892 A * | 1/1943 | Lowther ...................... 33/485 |
| 2,624,118 A | 1/1953 | Anderson |
| 2,677,192 A | 5/1954 | Anderson |
| 3,087,250 A * | 4/1963 | Blue ............................ 33/484 |
| 3,752,566 A | 8/1973 | Matthews |
| 4,060,902 A | 12/1977 | Keller |
| 4,194,295 A | 3/1980 | Simuro et al. |
| 4,495,709 A * | 1/1985 | Mainenti ..................... 33/484 |
| 4,503,624 A | 3/1985 | Whiteford |
| 4,653,194 A | 3/1987 | Kim |
| 4,745,688 A | 5/1988 | Jewers |
| 4,852,259 A | 8/1989 | Manserra |
| 4,922,621 A | 5/1990 | Maier |
| 5,253,426 A | 10/1993 | Mosbrucker |
| 5,279,041 A | 1/1994 | Wright |
| 5,459,935 A | 10/1995 | Paulson et al. |
| 5,471,749 A * | 12/1995 | Brady .......................... 33/484 |
| 5,615,488 A * | 4/1997 | Brady .......................... 33/484 |

(Continued)

FOREIGN PATENT DOCUMENTS

JP 5814001 A1 * 1/1983

Primary Examiner—G. Bradley Bennett
(74) Attorney, Agent, or Firm—Dennis J. Williamson; Moore & Van Allen PLLC

(57) ABSTRACT

A device and method for a straightedge with a handle and a level are provided. The device includes a rectangular body having at least one flat edge surface; a handle adapted to engage the rectangular body; and at least one leveling vial mounted to the handle. The vial indicates whether the at least one flat edge surface of the rectangular body is level against a planar surface when the handle is engaged with the rectangular body. The method of leveling or measuring includes the steps of providing a rectangular body having at least one flat edge surface, providing a handle adapted to fit with the rectangular body, the handle having at least one leveling vial mounted thereto, and removably engaging the body to the handle.

12 Claims, 4 Drawing Sheets

U.S. PATENT DOCUMENTS

| | | | |
|---|---|---|---|
| 6,049,991 A * | 4/2000 | Gruenberg et al. | 33/485 |
| 6,240,650 B1 | 6/2001 | Olson | |
| 6,379,080 B1 | 4/2002 | Saffo, Sr. | |
| 6,425,155 B1 | 7/2002 | Carey | |
| 6,463,666 B1 | 10/2002 | Szumer | |
| 6,594,939 B2 * | 7/2003 | Ondusko | 33/484 |
| 2004/0139622 A1 * | 7/2004 | Vik | 33/483 |

* cited by examiner

STRAIGHTEDGE WITH HANDLE AND LEVEL

This application claims priority to provisional application Ser. No. 60/464,184, filed Apr. 21, 2003, pending, which is incorporated herein in its entirety.

BACKGROUND OF THE INVENTION

Various types of levels and measuring instruments are used by craftsmen, such as construction workers, paper hangers, carpenters and hobbyists. A need often arises for marking at least two points on a surface such that the two points are horizontally or vertically oriented to each other or the line is vertically or horizontally leveled. Additionally, a line may need to be drawn or a measurement may be required between the leveled points. Craftsmen, such as paper hangers, may also desire a straightedge to serve as a cutting guide.

BRIEF SUMMARY OF THE INVENTION

The various aspects of the present invention provide a simple, sturdy and inexpensive combination tool combining a straightedge having a measuring scale, a removable handle and at least one leveling vial. In accordance with the present invention, a device and method are disclosed herein for a straightedge with a handle and a level.

According to one aspect of the present invention, there is provided a straightedge device. The device comprises a rectangular body having at least one flat edge surface; a removable handle adapted to engage the rectangular body; and at least one leveling vial mounted to the handle. The vial indicates whether the at least one flat edge surface of the rectangular body is level against a planar surface when the handle is engaged with the rectangular body.

In another aspect of the present invention, a method of leveling or measuring is provided. The method comprises the steps of providing a rectangular body having at least one flat edge surface; providing a handle adapted to fit with the rectangular body, the handle having at least one leveling vial mounted thereto, and removably engaging the body to the handle.

In another aspect of the present invention, a straightedge device is provided. The device includes a rectangular body having at least one flat edge surface, means for engaging the rectangular body, and means on said engaging means for leveling the rectangular body.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION OF THE INVENTION

Figure 1:
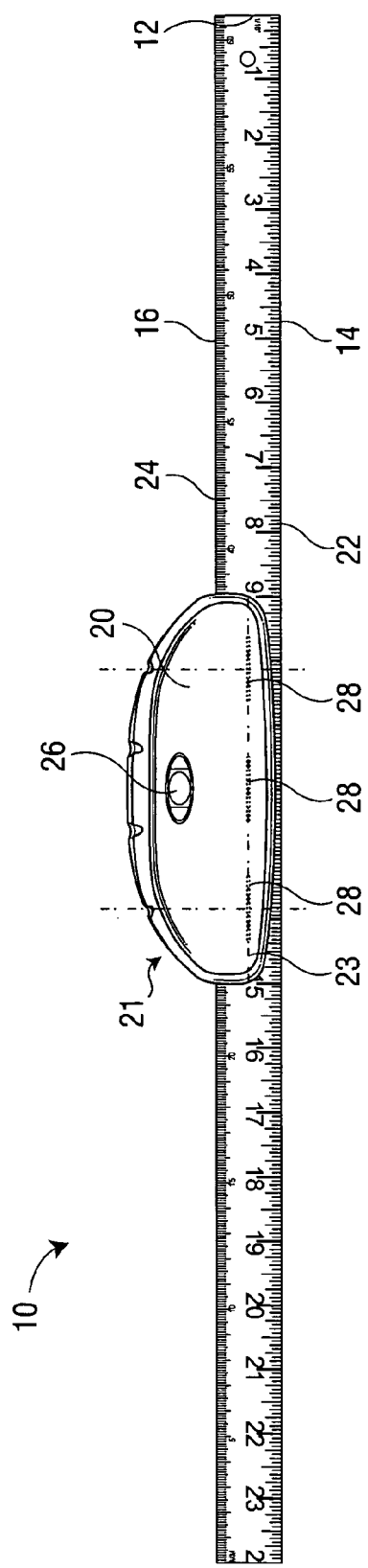
FIG. 1 is a plan view of a straight edge with a removable handle and a leveling vial in accordance with the present invention.

FIG. 1 illustrates a preferred embodiment of a straightedge device 10 of the present invention. The straightedge device 10 comprises a generally rectangular body 12 and a handle 20, slidably removable from the rectangular body 12. As shown in FIG. 1, the body 12 comprises a first surface 13, a second surface 15, and two flat edge surfaces 14 and 16. Flat edge surfaces 14 and 16 each have a measuring scale 22 and 24, respectively, shown on the first surface 13. In the preferred embodiment illustrated in FIG. 1, the measuring scale 22 has gradations in feet and inches and the measuring scale 24 has standard metric gradations. Other combinations of gradations are, of course, possible. The length of body 12 is preferably about six inches to about sixty inches, more preferably about twenty-four inches, although one skilled in the art will recognize that varying lengths may be defined.

The handle 20 is slidably positionable on the body 12 and completely removable from the body 12. In FIG. 1, the handle 20 is slidably attached and centered on the body 12. Alternatively, the handle 20 may also be secured in any position along the edge surface 14 or 16. The removable handle 20 provides leverage for pressing the measuring body against a surface without interrupting the continuity of the edge or getting in the way of drawing a line along the edge. The handle 20 may be secured to the body 12 along edge surface 14 or 16 to allow use of either measuring scale 22 or 24.

Figures 2A, 2B:
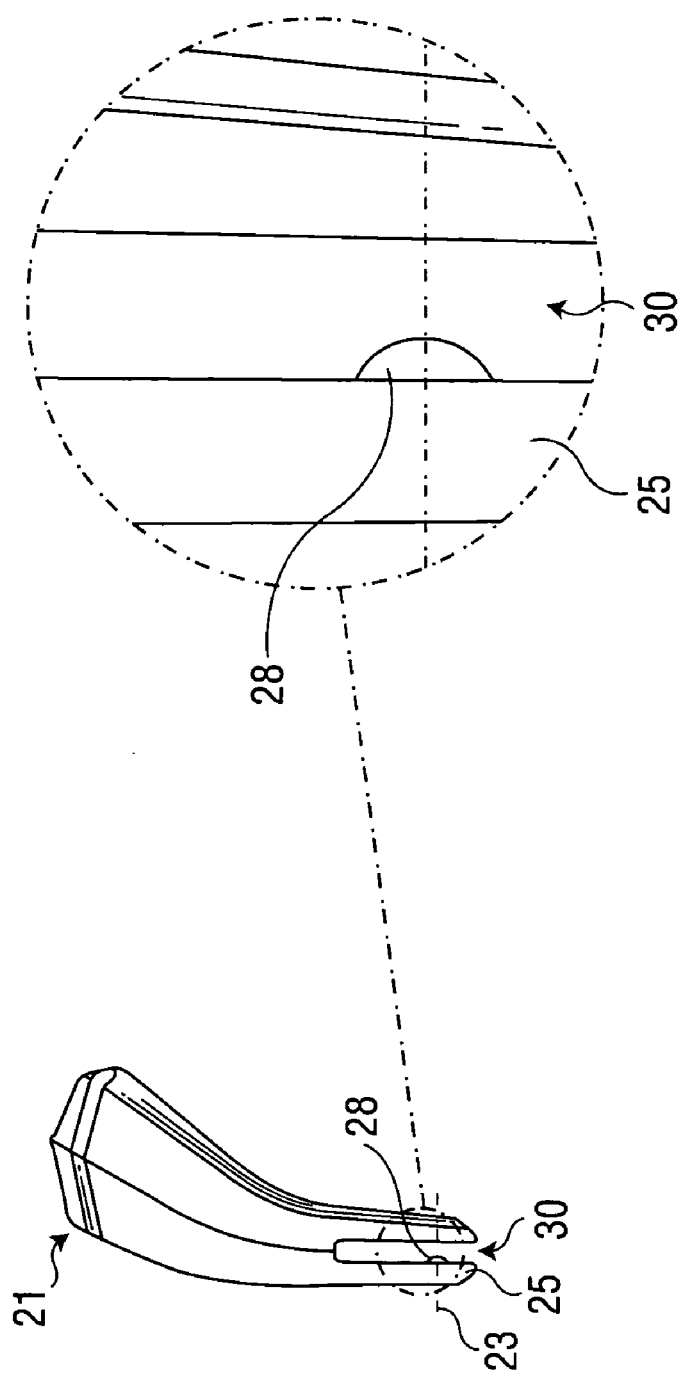
FIG. 2a is a cross sectional view of a handle of the embodiment of FIG. 1 in accordance with the present invention.
FIG. 2b is a magnified cross sectional view of the embodiment of FIG. 2a showing the attachment structure in accordance with the present invention.
Figure 2C:
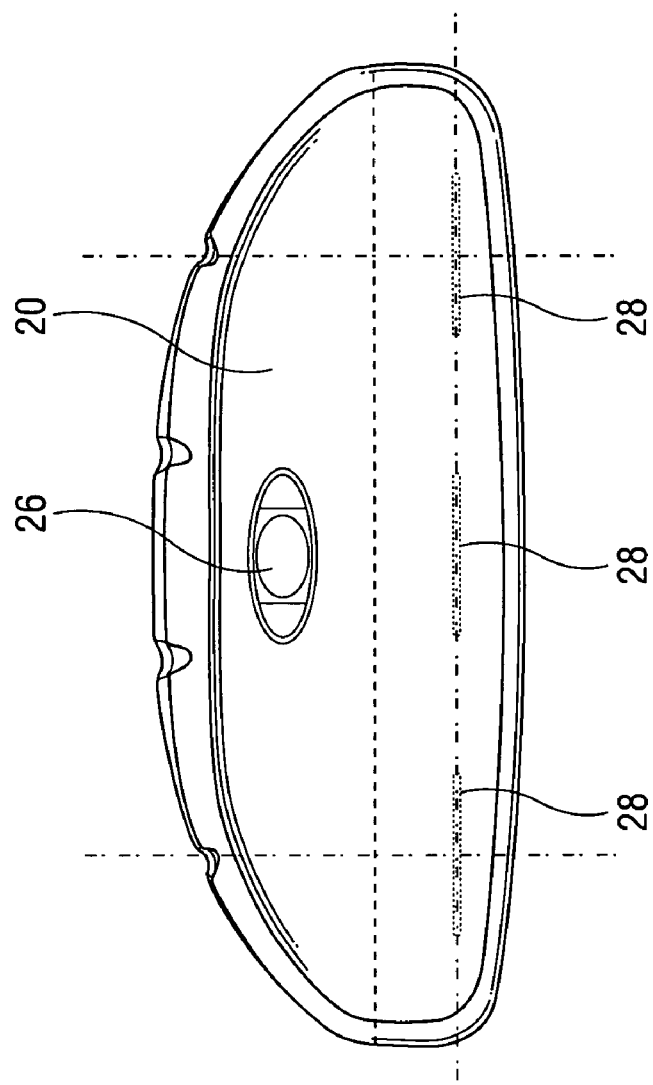
FIG. 2c is a plan view of a handle with a leveling vial of the embodiment shown in FIG. 1 with the handle removed from the measuring body.
Figure 3:
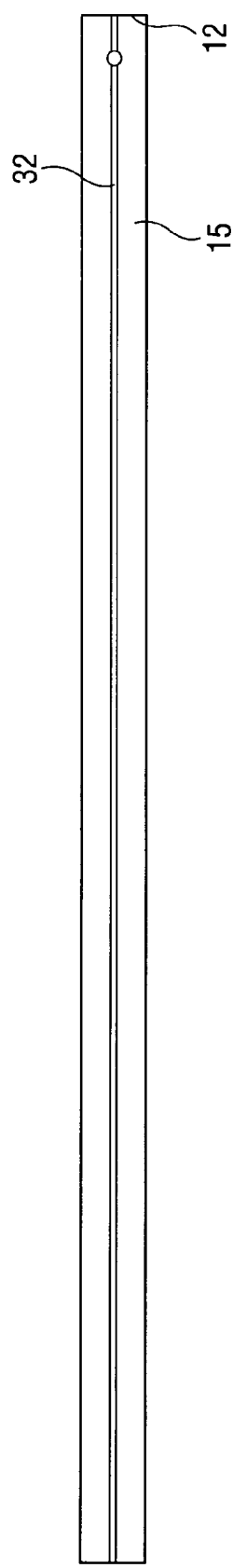
FIG. 3 is a plan view of a recessed channel in the second surface of the straight edge of FIG. 1 in accordance with the present invention.

FIGS. 2a–2c further illustrate the handle 20 of an embodiment of the present invention. FIG. 2a illustrates a cross-section view of the handle 20 in accordance with the present invention. The handle 20 comprises a curved grasping area 21 for comfort, an attachment area 23, and a leveling vial 26, captured within the grasping area 21. The attachment area 23 further comprises interior-facing protrusions 28. The handle 20, as illustrated, defines a receiving groove 30 adapted to secure the handle 20 to the body 12. The groove 30 slideably receives or captures the body 12 and protrusions 28 adaptably secure the body 12 in the groove 30 by tightly abutting against the body 12. In a preferred embodiment of the present invention, shown in FIG. 3, the second surface 15 of the body 12 includes a recessed channel 32 adapted to receive the protrusions 28 of the handle 20. The inwardly facing protrusions 28 may protrude from a first side of the handle 20 into the groove 30 and secure the body 12 in the groove 30 by tightly abutting against the recessed channel 32 in the body 12. The handle 20 may be curved away from the planar surface of groove 30 to provide leverage for the user to press the body 12 against a surface to be measured and leveled. The handle 20 may also be wider and thicker at the grasping area 21 as shown than the attachment area 23 to facilitate comfortable use of the handle 20.

FIG. 2b illustrates an exploded view of the protrusion 28 facing inwardly into the groove 30. The protrusions 28 extending from the handle 20 enable the user to easily adjust and centrally position of the handle along the measuring device. The protrusions 28 may be obround in shape and spaced apart across the groove 30 to allow the body 12 to slidably enter groove 30 and the protrusions 28 may protrude a sufficient distance into the groove 30 to tightly receive recessed channel 32 of the body 12. The handle 20 may slide along the length of the body 12 while the protrusions 28 are engaged with the recessed channel 32. Alternatively, the handle 20 may be slidably removed from the body 12 and reengaged with the handle 20 with the body 12 at a different position on the body 12. The protrusions 28 may be aligned along a planar axis approximately perpendicular to groove 30 in handle 20. As shown in FIG. 2c, a plurality of protrusions 28 are aligned on a planar axis and adapted to engage the recessed channel 32 of the body 12. The handle 20 may slide along the length of the body 12 while the protrusions 28 are engaged with the recessed channel 32, thereby allowing the handle 20 to be positioned at different positions along the length of the body 12 without removing the handle 20 from the body 12. Alternatively, the handle 20 may be completely removed to reposition the handle 20 on the body 12. In an alternative embodiment, the handle 20 may have at least one pair of the protrusions 28 extending into the groove 30 on opposite sides of the groove 30, preferably two pairs of the protrusions 28 to tightly receive the body 12 and prevent the tilting of the handle 20 relative to the body 12.

As shown in FIG. 2c, the handle 20 comprises a leveling vial 26, engaged within the handle 20. The leveling vial 26 may be engaged in the handle 20 in the horizontal, vertical or 45° positions to allow for three different leveling solutions. Additionally, a plurality of leveling vials 26 may be engaged with the handle 20 thereby allowing combinations of positions of leveling vials 26 in the handle 20. As shown in FIG. 2c, the handle 20 is completely detatchable from the body 12.

The handle 20 may be made of plastic or, alternatively, any material known to those of skill in the art that may be adapted to slideably receive the body 12. In a preferred embodiment, the handle 20 may be a one-piece molded plastic construction that forms the protrusions 28 in the attachment area 23, the groove 30, and the gripping area 21. The gripping area 21 may be made of molded rubber or other elastomeric material. The leveling vial 26 may be captured within the handle 20 during the molding process or alternatively, the leveling vial 26 may be secured within a recess formed within the handle 20.

The handle 20 secured to body 12 allows the user to make straight lines or mark multiple measured positions while leveling them at the same time. Alternatively, the handle 20 may be completely detached from the body 12, allowing a user to employ the body 12 as a standard measuring straightedge. The body 12 may preferably be made of metal, including aluminum, steel, or stainless steel.

The body 12 may further comprise a slot 36 formed therethrough near an end 19 of the body 12. The slot 36 is adapted hang the straightedge device 10 from a hook or merchandising rack for storage or sale. Although the slot 36 is shown in FIG. 1 as circular, any configuration adapted to receive a hook known in the art may be used with the present invention.

Although the invention herein has been described in connection with a preferred embodiment thereof, it will be appreciated by those skilled in the art that additions, modifications, substitutions, and deletions not specifically described may be made without departing from the spirit and scope of the invention as defined in the appended claims. The scope of the invention is defined by the appended claims, and all devices that come within the meaning of the claims, either literally or by equivalence, are intended to be embraced therein.

What is claimed is:

1. A straightedge device comprising:
    a body having at least one flat edge surface, another edge surface, a top surface and a bottom surface, said flat edge surface for engaging a planar surface;
    a removable handle having a first end and a second end, said first end engaging the another edge surface such that a first portion of the first end is adjacent the top surface and a second portion of the first end is adjacent the bottom surface, said handle having a surface that is curved between the first end and the second end, said surface that is curved contacting the planar surface and disposed between the body and said planar surface such that said second end is disposed in spaced relationship with respect to the planar surface when said flat edge surface engages the planar surface to provide leverage to press the flat edge surface against the planar surface; and
    at least one leveling vial mounted to said handle;
    wherein said vial indicates whether said at least one flat edge surface of said body is level against a planar surface when said handle is engaged with said body.

2. The straightedge device of claim 1 wherein said handle further comprises an attachment end defining a groove adapted to capture said body.

3. The straightedge device of claim 2 wherein said leveling vial is integrally molded to said handle.

4. The straightedge device of claim 3 further comprising at least one inwardly facing protrusion adapted to engage said body in said groove.

5. The straightedge device of claim 1 further comprising a recessed channel in said body adapted to engage said handle.

6. The straightedge device of claim 1 wherein said handle further comprises a grasping area.

7. The straightedge device of claim 1 wherein said body further comprises at least one measuring scale.

8. The straightedge device of claim 1 wherein said body is 24 inches in length.

9. A straightedge device comprising:
    a body having a first flat edge surface and a second flat edge surface, said rectangular body defining a plane having a first surface and a second surface between said first flat edge surface and said second flat edge surface;
    a removable handle adapted to engage said second flat edge surface in a first orientation where said first flat edge surface engages a planar surface and to engage said first flat edge surface in a second orientation where said second flat edge surface engages the planar surface, said handle having a first end defining an attachment area for engaging either the first flat edge surface or the second flat edge surface where said attachment area includes a first portion that is disposed over the first surface of the plane and a second portion that is disposed over a second surface of the plane and a second end defining a gripping area, said gripping area extending laterally beyond said plane defined by said body and being curved and being wider and thicker than said attachment area for comfortable gripping by a user, said handle being in contact with said planar surface when either the first flat edge surface or second flat edge surface engage the planar surface; and
    at least one leveling vial mounted to said handle;

wherein said vial indicates whether said at least one flat edge surface of said body is level against a planar surface when said handle is engaged with said body.

10. A straightedge device comprising:
a body having a first flat edge surface and a second flat edge surface for engaging a planar surface, a first surface and a second surface connecting said first and second flat edge surfaces;
a removable handle adapted to engage said body, said handle having a first end for engaging the body and a second end, said first end including a first portion and a second portion defining a groove for receiving either of said first flat edge surface or said second flat edge surface, said first portion being disposed over said first surface and said second portion being disposed over said second surface such that said second portion contacts said planar surface when one of said first flat edge surface or said second flat edge surface engages said planar surface, said handle being curved such that said second end is disposed in spaced relationship with respect to the planar surface when said second portion contacts the planar surface to provide leverage to press the body against the planar surface; and
at least one leveling vial mounted to said handle;
wherein said vial indicates the orientation of said first flat edge surface or said second flat edge surface on said planar surface when said handle is engaged with said body.

11. A straightedge device comprising:
a body having a first flat edge surface and a second flat edge surface for engaging a planar surface, a first surface and a second surface connecting said first and second flat edge surfaces;
a removable handle adapted to engage said body, said handle having a first end for engaging the body and a second end, said first end including a first portion and a second portion defining a groove for receiving either of said first flat edge surface or said second flat edge surface, said first portion being disposed over said first surface and said second portion being disposed over said second surface such that said second portion contacts said planar surface when one of said first flat edge surface or said second flat edge surface engages said planar surface, said handle second end is disposed in spaced relationship with respect to the planar surface when said second portion contacts the planar surface to provide leverage to press the body against the planar surface; and
at least one leveling vial mounted to said handle;
wherein said vial indicates the orientation of said first flat edge surface or said second flat edge surface on said planar surface when said handle is engaged with said body.

12. A straightedge device comprising:
a body having at least one flat edge surface and another edge surface, said flat edge surface for engaging a planar surface;
a removable handle having a first end and a second end, said first end engaging the another edge surface, said handle having a surface that is curved between the first end and the second end, said surface that is curved contacting the planar surface and disposed between the body and said planar surface such that said second end is disposed in spaced relationship with respect to the planar surface when said flat edge surface engages the planar surface to provide leverage to press the flat edge surface against the planar surface; and
at least one leveling vial mounted to said handle;
wherein said vial indicates whether said at least one flat edge surface of said body is level against a planar surface when said handle is engaged with said body.

* * * * *